(12) United States Patent
Lagerwey

(10) Patent No.: US 6,294,844 B1
(45) Date of Patent: Sep. 25, 2001

(54) ARTIFICIAL WIND TURBINE ISLAND

(75) Inventor: Hendrik Lambertus Lagerwey, Kootwijkerbroek (NL)

(73) Assignee: Lagerwey Windturbine B.V. (NL)

( * ) Notice: Subject to any disclaimer, the term of this patent is extended or adjusted under 35 U.S.C. 154(b) by 0 days.

(21) Appl. No.: 09/462,310

(22) PCT Filed: Jul. 7, 1998

(86) PCT No.: PCT/NL98/00387

§ 371 Date: Jan. 6, 2000

§ 102(e) Date: Jan. 6, 2000

(87) PCT Pub. No.: WO99/02856

PCT Pub. Date: Jan. 21, 1999

(30) Foreign Application Priority Data

Jul. 7, 1997 (NL) .................................................. 1006496

(51) Int. Cl.[7] .................................................. F03D 9/00
(52) U.S. Cl. .................................. 290/55; 290/44; 415/7
(58) Field of Search ................................. 290/43, 44, 54, 290/55; 415/4.1, 4.2, 7

(56) References Cited

U.S. PATENT DOCUMENTS

| | | | |
|---|---|---|---|
| 4,023,041 | * 5/1977 | Chappell | 290/53 |
| 4,159,427 | * 6/1979 | Wiedemann | 290/55 |
| 4,217,501 | * 8/1980 | Allison | 290/55 |
| 4,522,600 | * 6/1985 | Jost | 440/8 |
| 4,563,591 | * 1/1986 | Jones | 290/53 |
| 4,608,497 | 8/1986 | Boyce | 290/53 |
| 4,735,552 | 4/1988 | Watson | 416/99 |
| 5,062,765 | 11/1991 | McConachy | 415/4.3 |
| 5,520,505 | * 5/1996 | Weisbrich | 415/4.1 |
| 6,100,600 | * 8/2000 | Pflanz | 290/54 |

FOREIGN PATENT DOCUMENTS

| | | |
|---|---|---|
| 876 855 | 10/1979 | (BE) . |
| 31 07 252 | 9/1982 | (DE) . |
| 32 24 976 | 1/1984 | (DE) . |
| 0 074 938 | 3/1983 | (EP) . |
| 542 172 | 8/1922 | (FR) . |
| 2 413 566 | 7/1979 | (FR) . |
| 62-034899 | 2/1987 | (JP) . |

* cited by examiner

Primary Examiner—Nicholas Ponomarenko
(74) Attorney, Agent, or Firm—Westman, Champlin & Kelly, P.A.; S. Koehler

(57) ABSTRACT

The invention relates to an installation comprising windmills (1) which are mounted in a frame (5, 6, 7) said frame is provided with float bodies (15), and it is capable of rotation about a vertical axis in order to turn the windmills towards the wind. In order to keep the windmills upright, supporting means, for example a body (16) which is anchored to the bottom, are disposed some distance away from the plane of the windmills. Furthermore, means are provided for improving or simplifying maintenance.

18 Claims, 3 Drawing Sheets

ARTIFICIAL WIND TURBINE ISLAND

BACKGROUND OF THE INVENTION

The invention relates to an installation for converting wind energy into electric energy, which installation comprises a number of windmills provided with vanes which rotate about a substantially horizontal shaft, which horizontal shaft is supported in bearings in a gondola, which may also accommodate an electric generator, as well as a frame for supporting said gondolas with their horizontal shafts extending substantially parallel to each other, in such a manner that said vanes rotate in a substantially common plane, and float bodies attached to said frame, which function to keep the installation afloat.

Installations of this kind are known from literature, wherein various proposals have been made as regards the construction of such an installation. It is not known thereby, in particular when windmills having large dimensions are used, how the various problems which may present themselves thereby are to be solved. Said problems are in particular problems caused by the wind load on the vanes and on the frame, which may lead to tilting of the frame, which is not acceptable.

SUMMARY OF THE INVENTION

In order to avoid the above problems and in accordance with the invention, supporting means connected to the frame are provided, whereby said supporting means, which are disposed some distance away from said common plane, function to keep said common plane substantially vertically oriented. This leads to a construction which is supported in a stable manner.

According to one improvement, said supporting means are connected to the frame inter alia at locations near the gondolas. This further enhances the stability of the construction, whilst at the same a weight reduction is achieved.

According to one embodiment, the frame is provided with at least two horizontal rows of gondolas provided with windmills, one row being disposed above the other. By arranging two rows of gondolas one above the other, a large number of windmills can be incorporated in one structure, which increases the output which can be achieved with the installation.

According to one improvement of the invention, the frame is provided with at least one horizontal row of gondolas, whereby each row comprises at least three gondolas provided with windmills. Also in this manner it is possible to increase the number of windmills that are installed.

According to one embodiment, the float bodies comprise at least two floats, which are provided on one side of or near the common plane, whereby said supporting means are provided on the other side of said common plane. By using two floats, sufficient buoyancy is available for the windmills, whilst the flow resistance of the floats in the water and the waves is small. By disposing the supporting means on said other side of the common plane rather than on the side where the floats are disposed, a stable, floating structure is obtained, which rests on at least three supporting points.

According to one embodiment, the supporting means comprise a body which is anchored to the bottom, which body is attached to a connecting piece by means of a bearing, whereby said connecting piece is capable of rotation about a first vertical axis of rotation, and whereby said connecting piece is fixedly connected to the frame. As a result of this, the floating frame is position more or less at a fixed location.

According to one embodiment, said anchored body floats partly below and partly above the water surface, and it is secured to the bottom by means of an anchorage. As a result of this, wave movements and changing water levels can be followed in a simple manner.

According to one embodiment, the anchored body is fixed to the bottom, and said bearing can also rotate about one or two horizontal axes of rotation. This enables a stable anchoring of the installation, whilst the possibilities of motion within the bearing enable the installation to follow the movements caused by waves and tidal changes in the water level.

According to one embodiment, the bearing comprises transmission means for transmitting energy generated on the frame to an anchored power cable. Thus, the energy can be transported to a location ashore in a simple and known manner.

According to another aspect of the invention, the frame is provided with driving means for rotating the frame about a first vertical axis of rotation. This makes it possible in a simple manner to turn the windmills present in the frame to face the wind, which is necessary because it must not be assumed that the force of the wind alone is sufficient for achieving this. The fact is that the frame is also exposed to other forces, such as those of the current and the waves, whilst the wind direction at the level of the lower row of windmills is furthermore not always the same as that at the level of the upper row.

According to one embodiment, the driving means for rotating the frame comprise a mechanically driven ship's propellor, which is positioned in the water. This makes it possible to use a simple construction for the turning mechanism.

According to another embodiment, the flow resistance of the float bodies which are not anchored is greater in a first direction than in a second direction, and said float bodies are mounted on the frame by means of a bearing comprising a second vertical axis of rotation. This makes it possible to position the floats in a manner which minimizes the forces being exerted on the frame by the current.

According to another improvement, the float bodies can be rotated more or less parallel to each other by being driven about said second vertical axis of rotation. This makes it possible to rotate the installation about said first vertical axis of rotation under the influence of the current, because one float will experience a greater force than the other body if the direction in which said body flows is not parallel to the direction in which the flow resistance is smallest whilst said directions are indeed parallel with the other float. As a result of this difference in forces, the frame will experience a torque about the vertical axis of rotation, as a result of which the frame will start to rotate about said axis.

According to another aspect of the invention, the frame is provided with mounting means for mounting and dismounting parts of the windmills. The maintenance of windmills involves the use of mounting means which are not readily available on the water, and certainly not at sea. Since quite a few windmills are disposed closely together on the windmill island, it is worthwhile to provide a number of such facilities on the installation, as a result of which the maintenance costs will be strongly reduced.

According to one embodiment, said mounting means comprise a crane track and a crane, among other things, which crane track extends parallel to said common plane. By incorporating a crane in the installation, the cost of renting a mobile, seaworthy crane can be saved.

According to another aspect of the invention, the frame is provided with a platform for loading and unloading goods. This means a further simplification of the maintenance of the installation.

According to another aspect of the invention, the frame comprises crew's quarters for accommodating maintenance personnel for a prolonged period of time. This enables the constant presence of crew members on the installation, also during periods of bad weather conditions, for example.

BRIEF DESCRIPTION OF THE DRAWING

The invention will be explained in more detail hereafter by means of an embodiment thereof, which will be discussed with reference to a dravane, in which.

DETAILED DESCRIPTION OF THE ILLUSTRATIVE EMBODIMENT

Figure 1:
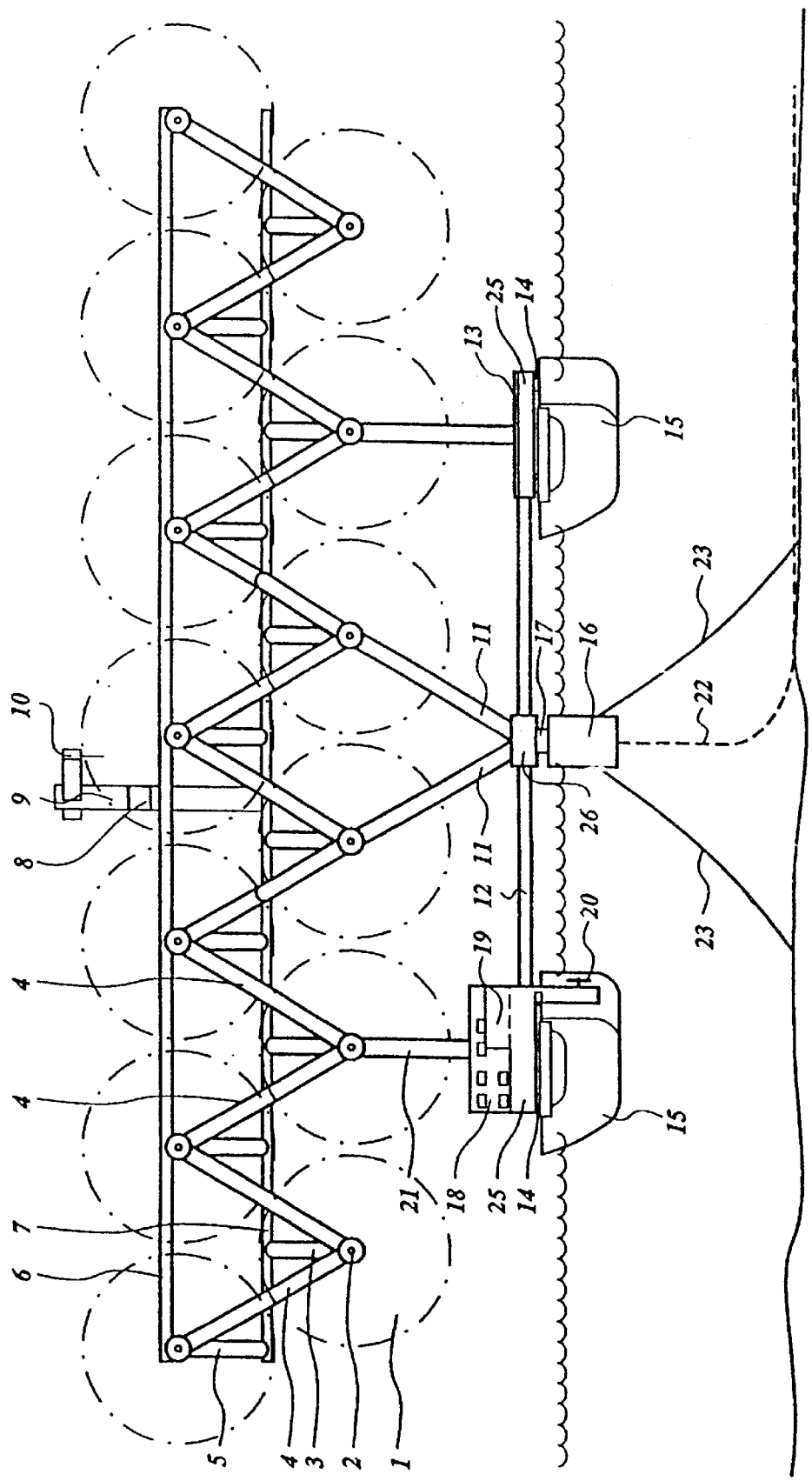
FIG. 1 is a front view of a windmill island.
Figure 2:
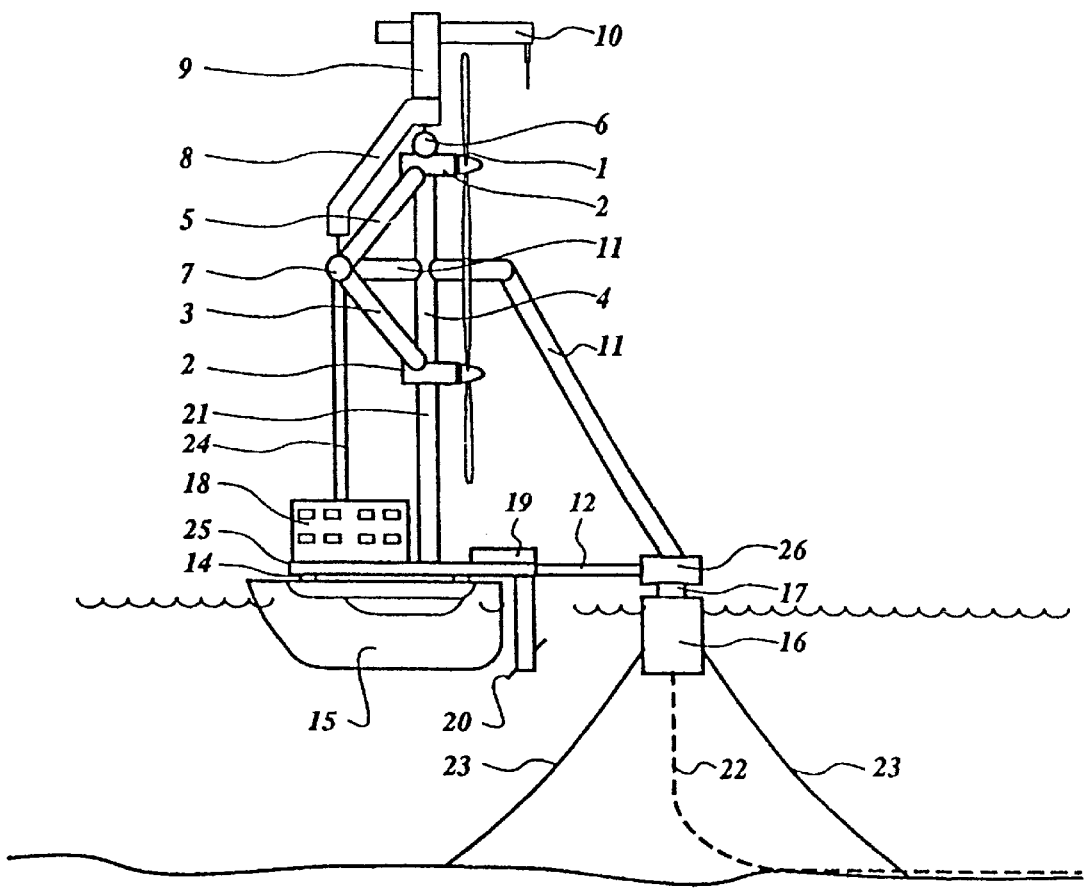
FIG. 2 is a side view of the windmill island of FIG. 1.
Figure 3:
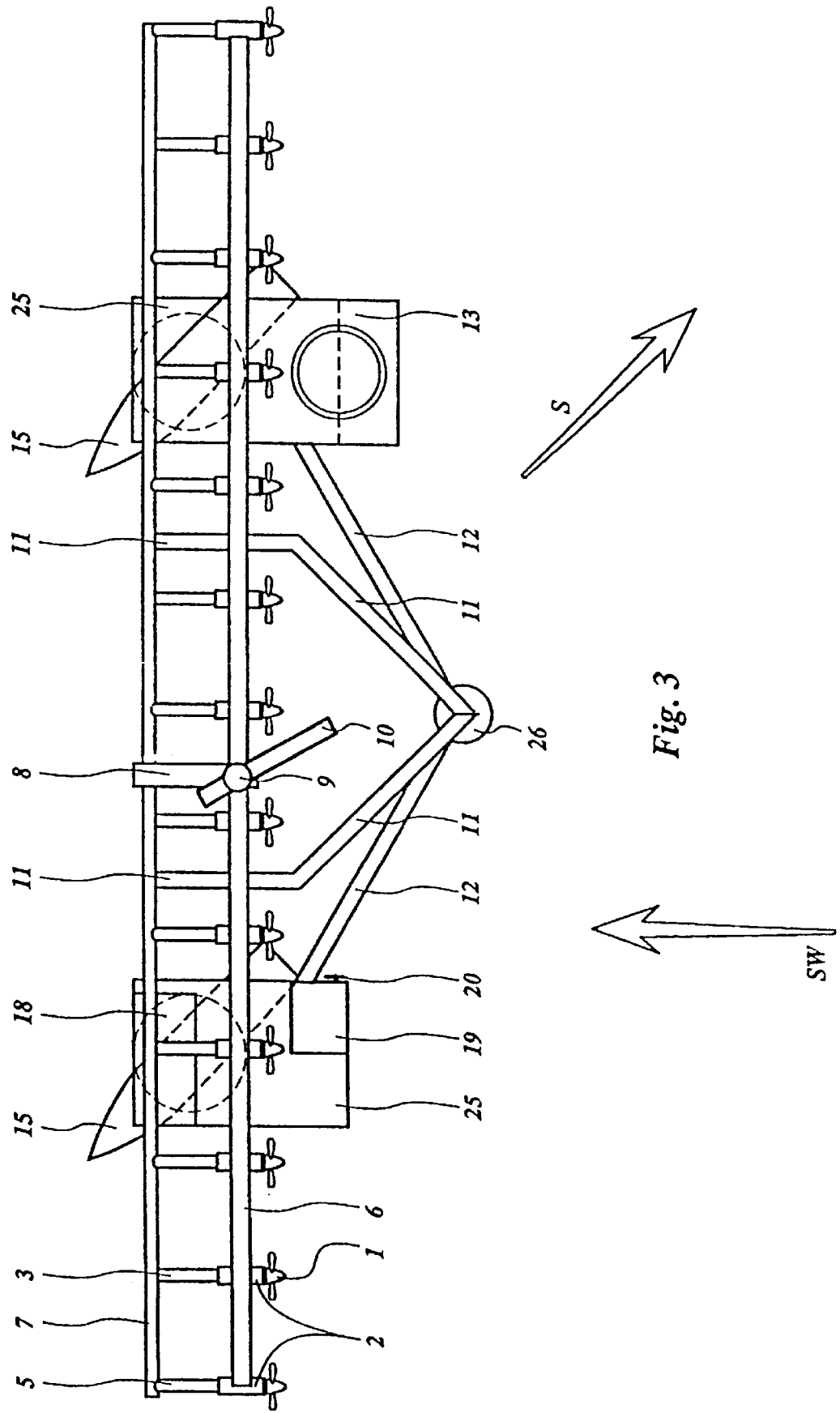
FIG. 3 is a plan view of the windmill island of FIG. 1.

The windmill island which is shown in FIGS. 1, 2 and 3 is a steel structure, in which rotors 1 comprising vanes, which are supported in bearings in gondolas 2, are mounted in two horizontal rows disposed one above the other. The upper row thereby consists of seven rotors 1 and gondolas 2, and the lower row consists of six rotors 1 and gondolas 2. The diameter of a rotor comprising vanes is about 50 metres, for example, whereby each windmill is capable of generating 1–2 Megawatt. The total amount of electric power to be generated by the windmill island will therefore range between 15 and 25 Megawatt.

The construction of the windmill island is as follows: A first column 21 and a second column 24 are disposed on a platform 25. Said columns support a steel framework, which is built up of an upper girder 6 and a lower girder 7, which are interconnected by a plurality of upper stay tubes 5. The gondolas 2 of the upper row of windmills are secured to the upper girder 6. The gondolas 2 of the lower row are secured to the upper row of gondolas by means of two vertical stay tubes 4 for each gondola, and to the lower girder by means of a lower stay tube 3. The illustrated embodiment comprises two platforms 25, which are each connected to a connecting piece 26 by means of a connecting tube 12. Connecting piece 26 is also connected to a vertical stay tube 4 and to lower girder 7 via a diagonal support 11.

Each platform 25 is connected to a rotatable float 15 by means of a bearing 14. Connecting piece 26 is connected, via a bearing 17, to an anchored float 16. Anchored float 16 is anchored to the sea or lake bottom by means of a number of anchoring cables 23. Connecting piece 26 can freely rotate, via bearing 17, with respect to anchored float 16. A propellor 20, which is driven by a motor disposed in engine room 19, is capable of rotating the floating island about the vertical axis of bearing 17, so that the windmills can be positioned with their largest surface directed towards wind W.

The windmill island can be anchored in a sea where the direction of the current S may change, for example under the influence of the wind or of the tides, whereby the direction of the current does not necessarily correspond with the direction of wind W. In order to keep the forces on the windmill island and its anchorage as low as possible, the rotatable floats 15 are designed to have a minimum flow resistance in one direction, for example having the shape of a ship's hull. The rotatable floats 15 can be turned in the direction of the current S with respect to platform 25 by means of a drive unit (not shown). Provisions have been made, for example in the form of a control unit, to ensure that rotatable floats 15 will extend more or less in the same direction. If there is a sufficiently strong current in the water in which the windmill island is anchored, it is also possible to turn the windmill island into the direction of wind W by positioning the rotatable floats 15 with respect to the frame by means of the control unit so that the forces exerted on floats 15 by the current cause the frame to rotate perpendicularly to the direction of wind W.

Besides the illustrated embodiment, wherein the anchored float 16 floats close to the water surface, it is also possible to use an embodiment comprising a fixed structure disposed on the bottom rather than an floating anchorage 16. In that case bearing 17 will be constructed in such a manner that connecting piece 26 is also capable of rotation about one or more horizontal axes of rotation, thus making it possible to compensate for movements caused by waves and changes in the water level. In that case bearing 17 will be a spherical bearing, for example.

The illustrated structure is predominantly made with steel tubes. It is also conceivable, however, to make part of the structure of another material, for example concrete. Furthermore it is conceivable to use stay wires in a known manner rather than steel tubes in a number of parts of the structure.

The energy generated by the windmill island is transported via a power cable 22, which terminates in anchored float 16. The bearing 17 is provided in a known manner with a collector ring or the like for transmitting the energy. It is also possible, however, not to use a collector ring, but to have the cable continue directly. In that case the control unit will include provisions which ensure that the frame will only rotate a limited number of times in one direction about the vertical axis of rotation of bearing 17, and that the frame will then rotate in the other direction. This will take place during periods that the wind velocity is low, whereby the frame is rotated back by means of propellor 20, for example.

A crane track, over which a crane 8 can move, is provided on upper girder 6 and lower girder 6 for the purpose of carrying out maintenance work on the windmills. A slevane arm 9 with a crane jib 10 is mounted on crane 8, in such a manner that the vanes can be lifted from the gondola and that possibly also the motors can be lifted from the gondola. Said parts can then be placed onto one of the platforms 25. The platforms 25 are fitted with a facility for mooring ships; furthermore, a helicopter landing platform 13 is provided. Crew's quarters 18 for accommodating the crew are present on one of the platforms 25. This enables the constant presence of crew members on the windmill island for carrying out the necessary maintenance work. In that way, possible inaccessibility of the island due to the weather conditions will not interfere with the work.

The illustrated structure comprises a number of facilities which enable easy access of the crew to all gondolas for carrying out maintenance work. For that purpose, the various parts of the frame may be provided with passages, lifts and gangways.

Besides the illustrated embodiment of the windmill island, which comprises two rows of windmills, various variants are possible within the scope of the invention. The dimensions of the mills may be larger or smaller thereby, whilst the number of mills in one row, or the number of rows of mills, may likewise vary.

In the illustrated embodiment, the axes of rotation of the rotors extend parallel to each other. An improvement would be achieved by configuring the plane for the vanes as a slightly cylindrical plane rather than as a usual vertical plane. Furthermore it is conceivable to use a slightly inclined plane rather than a vertical plane, if this would lead to an increased aerodynamic efficiency or to an improvement of other practical conditions. Also a combination of the above and other variants is possible, of course.

What is claimed is:

1. An installation for converting wind energy into electric energy, which installation comprises a number of windmills provided with vanes (1) which rotate about a substantially horizontal shaft, which horizontal shaft is supported in bearings in a gondola (2), as well as a frame for supporting said gondolas with their horizontal shafts extending substantially parallel to each other, in such a manner that said vanes rotate in a substantially common plane, and float bodies (15, 16) attached to said frame, which function to keep the installation afloat, characterized in that supporting means connected to the frame are provided, whereby said supporting means, which are disposed some distance away from said common plane, function to keep said common plane substantially vertically oriented.

2. An installation according to claim 1, characterized in that said supporting means are connected to the frame at locations near the gondolas.

3. An installation according to claim 1, characterized in that said frame is provided with at least two horizontal rows of gondolas provided with windmills, one row being disposed above the other.

4. An installation according to claim 1, characterized in that said frame is provided with at least one horizontal row of gondolas, whereby each row comprises at least three gondolas provided with windmills.

5. An installation according to claim 1 characterized in that said float bodies comprise at least two floats (15), which are provided on one side of or near the common plane, whereby said supporting means (16) are provided on the other side of said common plane.

6. An installation according to claim 4 characterized in that said supporting means comprise a body (16) which is anchored to the bottom, which body is attached to a connecting piece (26) by means of a bearing (17) whereby said connecting piece is capable of rotation about a first vertical axis of rotation, and whereby said connecting piece is fixedly connected to the frame.

7. An installation according to claim 6, characterized in that said anchored body floats partly below and partly above the water surface, and it is secured to the bottom by means of an anchorage (23).

8. An installation according to claim 6, characterized in that said anchored body is fixed to the bottom, and said bearing can also rotate about one or two horizontal axes of rotation.

9. An installation according to claim 6, 7 or 8, characterized in that said bearing comprises transmission means for transmitting energy generated on the frame to an anchored power cable (22).

10. An installation according to claim 1 characterized in that said frame is provided with driving means (15, 20) for rotating the frame about a first vertical axis of rotation.

11. An installation according to claim 10, characterized in that said driving means for rotating the frame comprise a mechanically driven ship's propellor (20), which is positioned in the water.

12. An installation according to claim 1 characterized in that the flow resistance of the float bodies which are not anchored is greater in a first direction than in a second direction, and in that said float bodies are mounted on the frame by means of a bearing (14) comprising a second vertical axis of rotation.

13. An installation according to claim 12, characterized in that said float bodies can be rotated more or less parallel to each other by being driven about said second vertical axis of rotation.

14. An installation according to claim 1 characterized in that said frame is provided with mounting means for mounting and dismounting parts of the windmills.

15. An installation according to claim 14, characterized in that said mounting means (8, 9, 10) comprise a crane track and a crane (8, 9, 10), which crane track extends parallel to said common plane.

16. An installation according to claim 1 characterized in that said frame is provided with a platform (13, 25) for loading and unloading goods.

17. An installation according to claim 1 characterized in that said frame comprises crew's quarters (18) for accommodating maintenance personnel for a prolonged period of time.

18. An installation according to claim 1, characterized in that each gondola further includes an electric generator coupled to each respective shaft.

* * * * *

UNITED STATES PATENT AND TRADEMARK OFFICE
CERTIFICATE OF CORRECTION

PATENT NO.   : 6,294,844 B1
DATED        : September 25, 2001
INVENTOR(S)  : Lagerwey It is certified that error appears in the above-identified patent and that said Letters Patent is hereby corrected as shown below:

Column 3,
Line 17, replace "drovane" with -- drawing --.

Column 5,
Line 42, insert -- , -- after "(17)".

Column 6,
Line 7, delete ", 7 or 8".

Signed and Sealed this

Fifteenth Day of June, 2004

JON W. DUDAS
*Acting Director of the United States Patent and Trademark Office*